(12) United States Patent
Neri et al.

(10) Patent No.: US 10,434,447 B2
(45) Date of Patent: Oct. 8, 2019

(54) DOOR AND DOOR CLOSURE SYSTEM FOR AN AIR FILTER CABINET

(71) Applicant: Ademco Inc., Golden Valley, MN (US)

(72) Inventors: Alejandro Neri, Chihuahua (MX); Carlos Villanueva, Chihuahua (MX); Aaron Gonzalez, Chihuahua (MX)

(73) Assignee: Ademco Inc., Golden Valley, MN (US)

( * ) Notice: Subject to any disclaimer, the term of this patent is extended or adjusted under 35 U.S.C. 154(b) by 41 days.

(21) Appl. No.: 14/950,455

(22) Filed: Nov. 24, 2015

(65) Prior Publication Data

US 2017/0144093 A1 May 25, 2017

(51) Int. Cl.
*B01D 46/00* (2006.01)
*B01D 46/10* (2006.01)
*B01D 46/42* (2006.01)
*B01D 46/52* (2006.01)

(52) U.S. Cl.
CPC ..... *B01D 46/0004* (2013.01); *B01D 46/0026* (2013.01); *B01D 46/10* (2013.01); *B01D 46/4227* (2013.01); *B01D 46/521* (2013.01); *B01D 2265/023* (2013.01)

(58) Field of Classification Search
CPC ............... B01D 46/0004; B01D 46/10; B01D 2279/40; B01D 2265/04; B01D 2265/023; E05C 19/16; E06B 1/12; E06B 5/00
See application file for complete search history.

(56) References Cited

U.S. PATENT DOCUMENTS

| | | | | |
|---|---|---|---|---|
| 5,458,667 A * | 10/1995 | Poggi, Jr. | ............... | B01D 46/10 55/480 |
| 5,716,115 A * | 2/1998 | Anoszko | ................. | F24F 13/28 220/315 |
| 7,252,696 B2 * | 8/2007 | Jenkins | ............. | B01D 46/0005 55/481 |
| 8,157,881 B1 * | 4/2012 | Anoszko | ........... | B01D 46/0005 55/497 |
| 8,540,792 B2 * | 9/2013 | Crook | ............... | B01D 46/0004 55/480 |
| 2004/0183313 A1 * | 9/2004 | Sherman | ................... | A47F 7/03 292/251.5 |
| 2005/0243269 A1 * | 11/2005 | Zelman | ................... | G02C 9/00 351/45 |
| 2007/0204575 A1 * | 9/2007 | Lisbona | ............ | B01D 46/0004 55/495 |
| 2010/0230979 A1 * | 9/2010 | Gries | ...................... | E05C 19/16 292/251.5 |
| 2011/0080009 A1 * | 4/2011 | Redgrave | ............... | E05C 19/16 292/251.5 |
| 2011/0308210 A1 * | 12/2011 | Crabtree | ........... | B01D 46/0005 55/483 |

(Continued)

FOREIGN PATENT DOCUMENTS

EP 2692973 A1 2/2014

*Primary Examiner* — Amber R Orlando
*Assistant Examiner* — Brit E. Anbacht
(74) *Attorney, Agent, or Firm* — Shumaker & Sieffert, P.A.

(57) ABSTRACT

A door and door closure system for an air filter cabinet are described herein. One device includes a magnet recess, a magnet coupled to the magnet recess and configured to engage with a magnet recess of a frame of an air filter cabinet and automatically align the door with the frame of the air filter cabinet when engaged with the magnet recess of the frame, and a handle adjacent the magnet recess of the door.

16 Claims, 5 Drawing Sheets

(56) References Cited

U.S. PATENT DOCUMENTS

| | | | |
|---|---|---|---|
| 2013/0067819 A1* | 3/2013 | McLain | E06B 5/01 49/463 |
| 2013/0105379 A1* | 5/2013 | Lee | B01D 29/21 210/222 |
| 2013/0163197 A1* | 6/2013 | Mack | F16M 11/00 361/679.56 |
| 2013/0180898 A1* | 7/2013 | Chajec | B01D 35/153 210/85 |
| 2015/0209462 A1* | 7/2015 | Turbett | B01D 46/0023 436/1 |
| 2015/0257432 A1* | 9/2015 | Leavitt | A23L 3/54 34/267 |
| 2015/0260387 A1* | 9/2015 | Gamble | F21V 23/0471 362/157 |
| 2018/0258686 A1* | 9/2018 | Christenson | B64D 11/00 |

\* cited by examiner

DOOR AND DOOR CLOSURE SYSTEM FOR AN AIR FILTER CABINET

TECHNICAL FIELD

The present disclosure relates to a door and door closure system for an air filter cabinet.

BACKGROUND

An air filter is a device comprised of fibrous materials that can remove solid particulates, such as dust, pollen, mold, and bacteria, from air. A furnace, such as a furnace for a home or other residence, may utilize an air filter during operation to remove such solid particulates from the air being circulated through the home or residence. For example, cool air may pass into the furnace through the air filter, and the filtered cool air may then be heated by the furnace and circulated through the home or residence.

The air filter for a furnace may be housed in an air filter cabinet that can be coupled to the furnace. For instance, the air filter cabinet may be attached to the side of the furnace where the cool air enters into the furnace. Further, the air filter cabinet may include a door through which the air filter can be inserted into the cabinet.

The particulates removed from the air by the air filter may accumulate in the filter, which may eventually slow and/or block the flow of air into the furnace. Accordingly, the air filter may need to be periodically replaced to ensure proper and efficient operation of the furnace. To replace the air filter, a user may open the door of the air filter cabinet, remove the old filter from the cabinet, insert a new filter into the cabinet, and then close the door.

Previous air filter cabinet doors, however, can be difficult to open and/or close, which can make it difficult to remove and/or replace the air filter in the cabinet. For instance, previous air filter cabinet doors may need a strong pull to be opened, and/or may need a strong push to be closed. Further, previous air filter cabinet doors may include a number of components and/or features that can make manufacturing the door difficult and/or costly.

DETAILED DESCRIPTION

A door and door closure system for an air filter cabinet are described herein. For example, one or more embodiments include a magnet recess, a magnet coupled to the magnet recess and configured to engage with a magnet recess of a frame of an air filter cabinet and automatically align the door with the frame of the air filter cabinet when engaged with the magnet recess of the frame, and a handle adjacent the magnet recess of the door.

A door and door closure system for an air filter cabinet in accordance with the present disclosure can be easier to open and close than previous air filter cabinet doors. For example, a door and door closure system for an air filter cabinet in accordance with the present disclosure can automatically align the door with the cabinet (e.g., with a frame of the cabinet), without needing guidance or a strong push from the user of the door to complete and secure the closure of the door. In contrast, previous air filter cabinet doors may force the user to guide the door all the way until it is fully engaged with the cabinet and/or apply a strong push to the door to complete and secure the closure of the door. Further, a door and door closure system for an air filter cabinet in accordance with the present disclosure may not need a strong pull from the user in order to open the door, which is in contrast to previous air filter cabinet doors, which may need a strong pull from the user to be opened.

Further, a door and door closure system for an air filter cabinet in accordance with the present disclosure can be easier and/or cheaper to manufacture than previous air filter cabinet doors, because such a door and door closure system may include and use fewer features and/or components than previous air filter cabinet doors. For example, a door and door closure system in accordance with the present disclosure may not include or use any springs, screws, or rivets, or a top cover or cosmetic case. In contrast, previous air filter cabinet doors may include any or all of such components and features.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIGS. 1A-1C, and a similar element may be referenced as 302 in FIGS. 3A-3D.

As used herein, "a" or "a number of" something can refer to one or more such things. For example, "a number of tabs" can refer to one or more tabs.

Figure 1A:
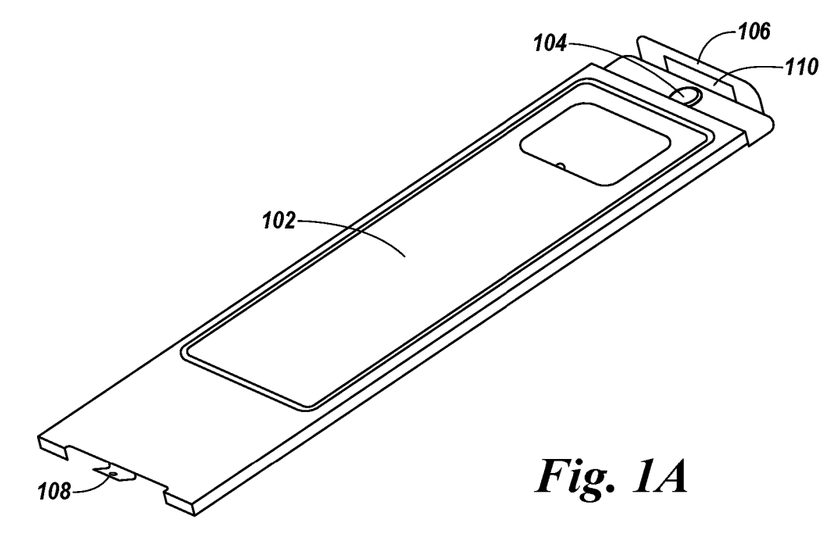
FIGS. 1A-1C illustrate various views of a door for an air filter cabinet in accordance with one or more embodiments of the present disclosure.
Figure 1B:
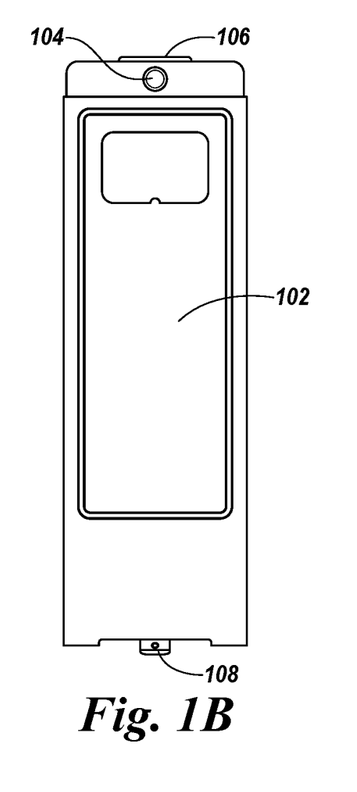
Figure 1C:
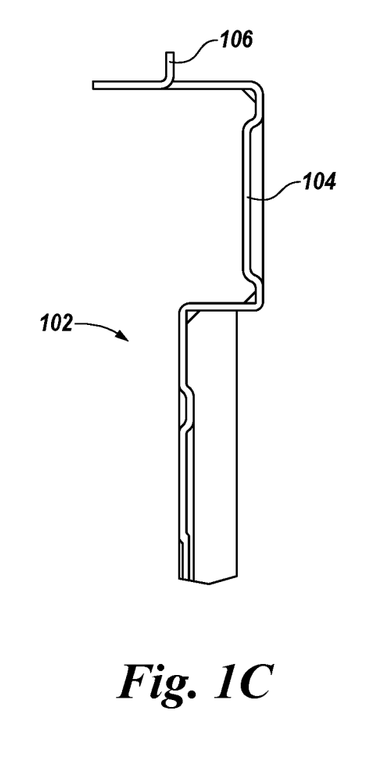

FIGS. 1A-1C illustrate various views of a door 102 for an air filter cabinet in accordance with one or more embodiments of the present disclosure. For example, FIG. 1A illustrates an angled perspective view of door 102, FIG. 1B illustrates a schematic front view of door 102, and FIG. 1O illustrates a schematic cross-sectional view of a portion (e.g., the top portion) of door 102.

Door 102 can be a metal door. For instance, door 102 can be made from and/or comprise a metal material, such as steel. Door 102 can be rectangular, with a width of approximately 6.5 inches and a height of approximately 16 inches or approximately 20 inches. However, embodiments of the present disclosure are not limited to a particular shape or dimensions for door 102.

As shown in FIGS. 1A-1C, door 102 can include a magnet recess 104 formed therein. For instance, as illustrated in FIG. 10, door 102 can include a top portion that extends outward (e.g., to the right in FIG. 10) at a ninety degree angle from the rest of door 102, and then extends upward at a ninety degree angle, with magnet recess 104 formed in the upward extending part of the top portion. In the example illustrated in FIGS. 1A-1C, magnet recess 104 is circular, and can have a diameter of approximately 0.75 inches and a depth of approximately 0.07 inches. Further, the outward extending part of the top portion of door 102 can have a width of (e.g., extend outward for) approximately 0.43 inches, and the upward extending part of the top portion of door 102 can have a height of (e.g., extend upward for) approximately 1.19 inches. However, embodiments of the present disclosure are not limited to a particular shape or dimensions for magnet recess 104 or the top portion of door 102.

Although not shown in FIGS. 1A-1C, in some embodiments door 102 can include a magnet coupled to magnet recess 104. The magnet can be coupled to magnet recess 104 after door 102 has been formed, and can be coupled to magnet recess 104 using an adhesive such as, for instance, a pressure-sensitive adhesive. The magnet can engage with a magnet recess of a frame of an air filter cabinet, such as frame 212 and 312 further described herein in connection with FIGS. 2A-2B and 3A-3D, respectively, to automatically align door 102 with the frame, as will be further described herein.

As shown in FIGS. 1A-1C, door 102 can include a handle 106 adjacent magnet recess 104. For instance, as illustrated in FIG. 10, handle 106 can extend inward (e.g., to the left in FIG. 10, back above the rest of door 102) at a ninety degree angle from the top of the top portion of door 102. In the example illustrated in FIGS. 1A-1C, handle 106 is rectangular, and can have a length of approximately 5.12 inches, and a width of approximately 0.91 inches. However, embodiments of the present disclosure are not limited to a particular shape or dimensions for handle 106.

As shown in FIG. 1A, handle 106 can include an opening 110 formed therein. Opening 110 may also be rectangular, and can have a length of approximately 2.93 inches and a width of approximately 0.50 inches. However, embodiments of the present disclosure are not limited to a particular shape or dimensions for opening 110. A user can place his or her fingers through opening 110 to grip (e.g., grab) handle 106 when opening or closing door 102.

Further, as shown in FIGS. 1B and 10, handle 106 can include a portion that extends upward at a ninety degree angle from the rest of handle 106 adjacent a length side of opening 110. The upward extending portion of handle 106 can have a height of (e.g., extend upward for) 0.17 inches, and can help the user secure his or her grip upon handle 106.

Handle 106 can form a part of the geometry of door 102. For instance, handle 106 can be an integral part of the geometry of door 102. That is, handle 106 is not an additional or separate component that gets coupled or attached to door 102 during processing (e.g., manufacturing) of door 102. Rather, door 102 can be formed using a single die having a mold (e.g., shape) for magnet recess 104 and a mold (e.g., shape) for handle 106.

As shown in FIGS. 1A and 1B, door 102 can include a flange 108 at the bottom of door 102. For instance, as illustrated in FIGS. 1A and 1B, flange 108 can extend from the bottom of door 102. Flange 108 can extend outward at an angle of, for example, 25 or 28 degrees from the bottom of door 102. Flange 108 can engage with (e.g., be inserted into) an opening (e.g., slot or hole) in the bottom of the frame of the air filter cabinet as part of (e.g., to assist the user with) the process of engaging the magnet coupled to magnet recess 104 with the frame, as will be further described herein (e.g., in connection with FIGS. 3A-3D).

Figure 2A:
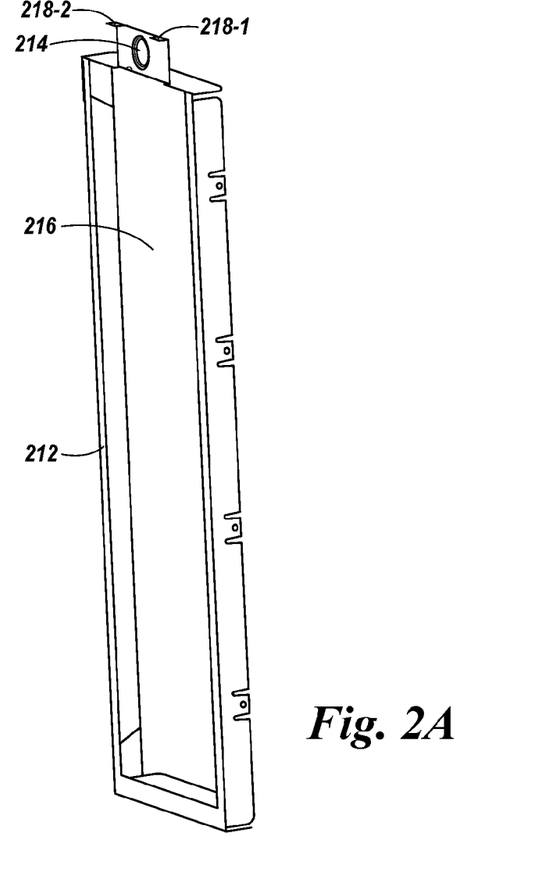
FIGS. 2A-2B illustrate various views of a door frame for an air filter cabinet in accordance with one or more embodiments of the present disclosure.
Figure 2B:
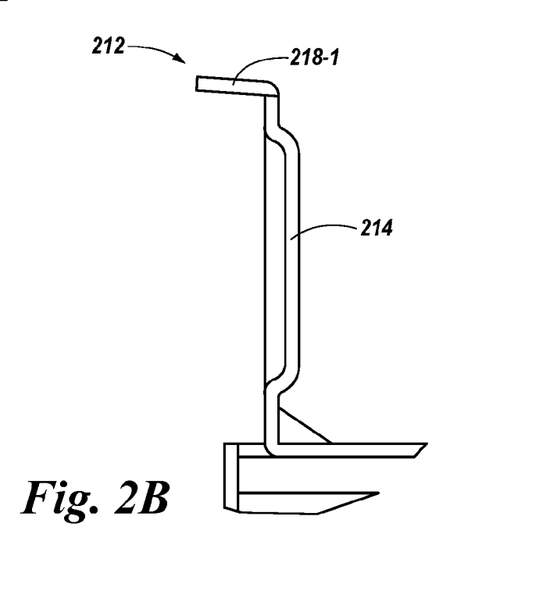

FIGS. 2A-2B illustrate various views of a door frame 212 for an air filter cabinet in accordance with one or more embodiments of the present disclosure. For example, FIG. 2A illustrates an angled perspective view of frame 212, and FIG. 2B illustrates a schematic cross-sectional view of a portion (e.g., the top portion) of frame 212.

Frame 212 can be a metal frame. For instance, frame 212 can be made from and/or comprise a metal material, such as steel. Frame 212 can be rectangular, and have a rectangular opening 216 formed therein, as illustrated in FIG. 2A. Frame 212 can be coupled (e.g., attached) to an air filter cabinet, as will be further described herein (e.g., in connection with FIGS. 3A-3D).

Frame 212 can have the same or similar shape and/or dimensions as door 102 previously described in connection with FIGS. 1A-1C. For instance, frame 212 can have a width of approximately 6.6 inches and a height of approximately 16 inches or approximately 20 inches. Further, opening 216 can have the same or similar shape and/or dimensions as the opening of the air filter cabinet to which frame 212 is to be coupled. However, embodiments of the present disclosure are not limited to a particular shape or dimensions for frame 212 or opening 216.

As shown in FIGS. 2A and 2B, frame 212 can include a magnet recess 214 formed therein. For instance, as illustrated in FIGS. 2A and 2B, frame 212 can include a top portion that extends straight upward from the rest of frame 212, with magnet recess 214 formed in the upward extending top portion. Magnet recess 214 can have the same or similar shape and/or dimensions as magnet recess 104 previously described in connection with FIGS. 1A-1C. For instance, in the example illustrated in FIGS. 2A and 2B, magnet recess 214 is circular, and can have a diameter of approximately 0.73 inches and a depth of approximately 0.07 inches. Further, the upward extending top portion of frame 212 can have the same or similar dimensions as the upward extending part of the top portion of door 102 previously described in connection with FIGS. 1A-1C. For instance, the upward extending top portion of frame 212 can have a height of (e.g., extend upward for) approximately 1.22 inches. However, embodiments of the present disclosure are not limited to a particular shape or dimensions for magnet recess 214 or the top portion of frame 212. Frame 212 can be formed using a single die having a mold for magnet recess 214.

Although not shown in FIGS. 2A-2B, in some embodiments a magnet (e.g., magnet 324 described in connection with FIGS. 3A-3D) can be coupled (e.g., attached) to magnet recess 214. The magnet can be coupled to magnet recess 214 after frame 212 has been formed, and can be coupled to magnet recess 214 using an adhesive, such as, for instance, a pressure-sensitive adhesive. In such embodiments, a magnet may not be coupled to magnet recess 104 of door 102 previously described in connection with FIGS. 1A-1C, and the magnet coupled to magnet recess 212 can engage with magnet recess 104 to automatically align door 102 with frame 212, as will be further described herein (e.g., in connection with FIGS. 3A-3D).

Alternatively, in some embodiments, a magnet may not be coupled to magnet recess 214. Rather, in such embodiments, a magnet may be coupled to magnet recess 104 of door 102, and this magnet can engage with magnet recess 214 to automatically align door 102 with frame 212, as previously described in connection with FIGS. 1A-1C.

As shown in FIGS. 2A and 2B, frame 212 can include a number of tabs (e.g., tabs 218-1 and 218-2) adjacent magnet recess 214. For instance, as illustrated in FIGS. 2A and 2B, tabs 218-1 and 218-2 can extend away from magnet recess 214 (e.g., to the left in FIG. 2B) at a 94 degree angle from the top of the top portion of frame 212. Door 102 can be placed (e.g., fit and/or slid) under the tabs to assist with the process of engaging the magnet coupled to magnet recess 214 with magnet recess 104, or engaging the magnet coupled to magnet recess 104 to magnet recess 214, as will be further described herein (e.g., in connection with FIGS. 3A-3D). Although the example illustrated in FIGS. 2A and 2B includes two such tabs, embodiments of the present disclosure are not limited to a particular number of tabs, or to a particular angle at which the tabs extend away from magnet recess 214.

Although not shown in FIGS. 2A-2B, frame 212 can include an opening, such as a slot or a hole, at the bottom. During the engagement of the magnet coupled to magnet recess 214 with magnet recess 104, or the engagement of the magnet coupled to magnet recess 104 with magnet recess 214, such an opening can engage with (e.g., receive) flange 108 previously described in connection with FIG. 1 to assist with the magnet engagement process, as will be further described herein (e.g., in connection with FIGS. 3A-3D).

Figure 3A:
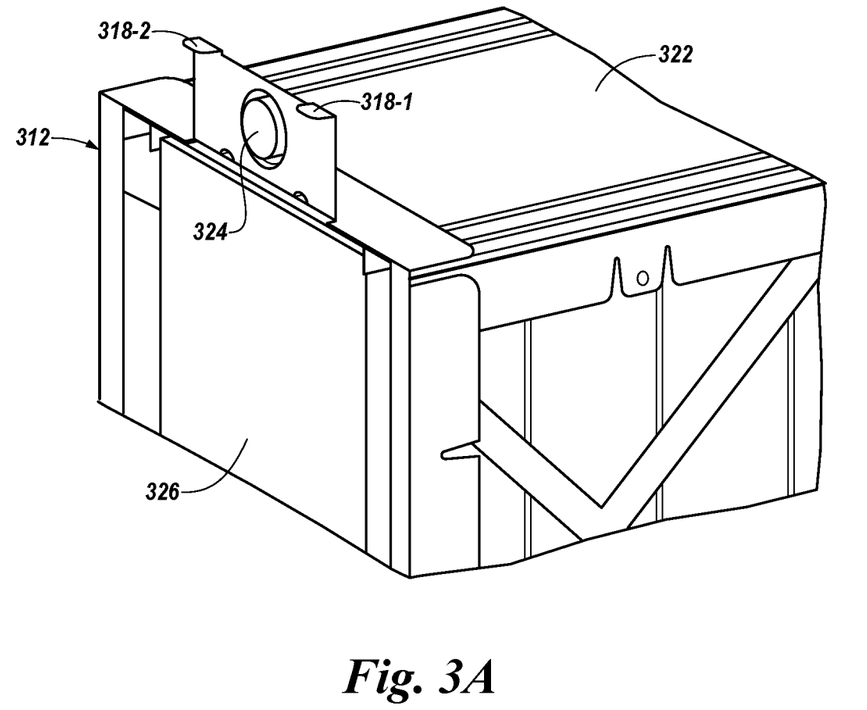
FIGS. 3A-3D illustrate various views of a door closure system for an air filter cabinet in accordance with one or more embodiments of the present disclosure.
Figure 3B:
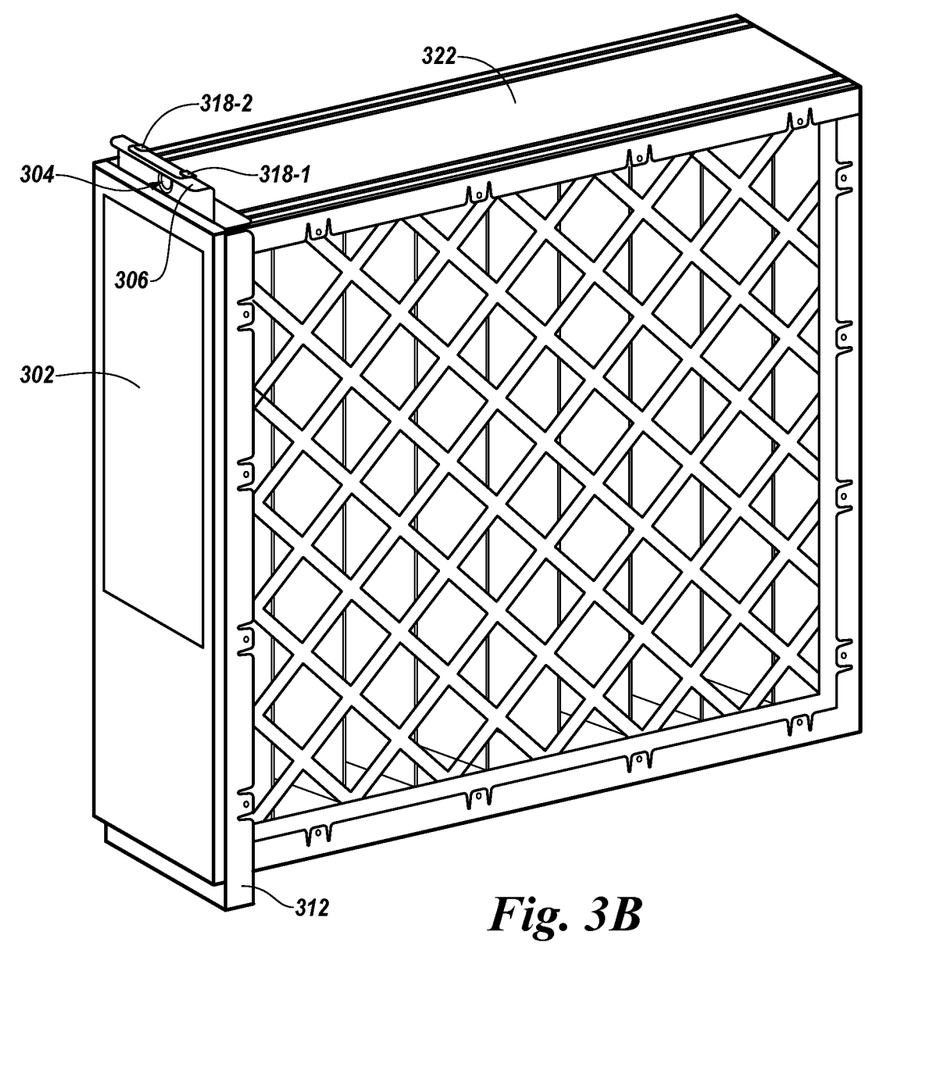
Figure 3C:
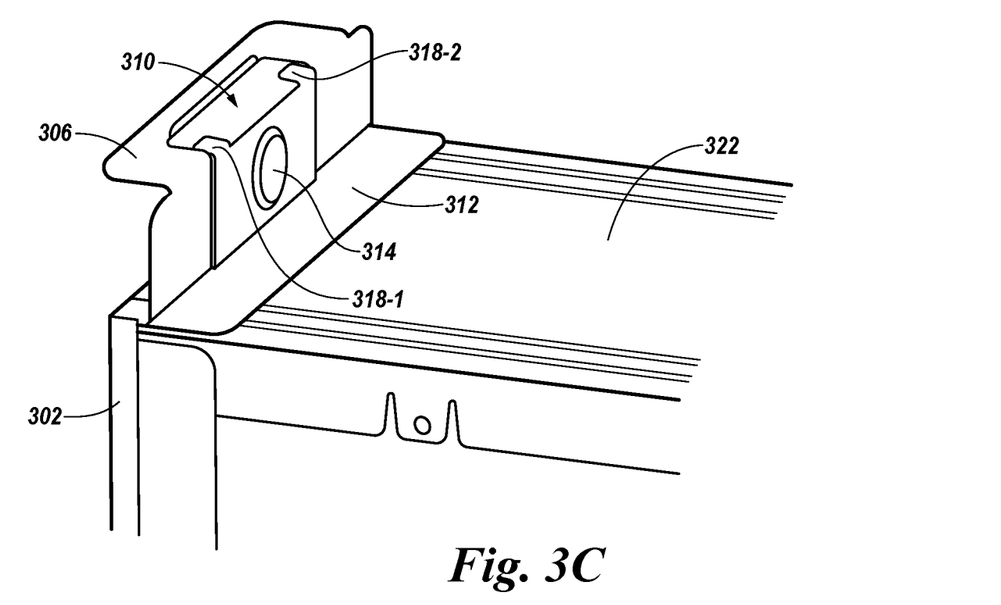
Figure 3D:
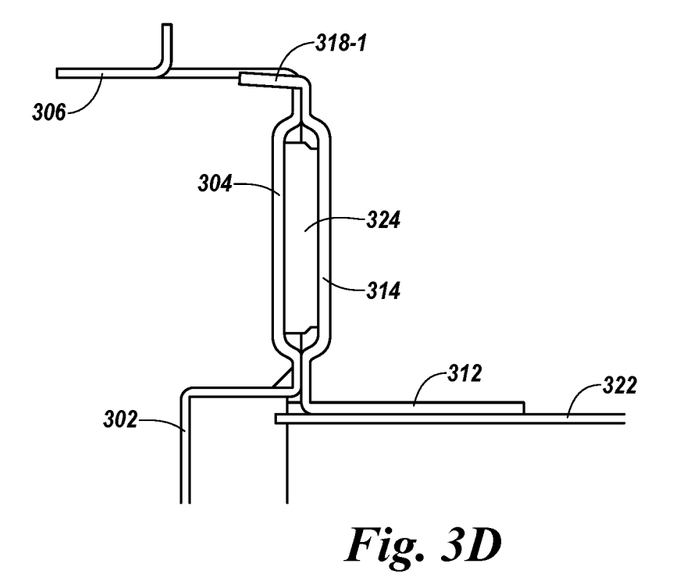

FIGS. 3A-3D illustrate various views of a door closure system for an air filter cabinet 322 in accordance with one or more embodiments of the present disclosure. For example, FIGS. 3A, 3B, and 3C illustrate various angled perspective views of the door closure system, and FIG. 3D illustrates a schematic cross-sectional view of a portion (e.g., the top portion) of the door closure system.

Air filter cabinet 332 can be, for example, the air filter cabinet for (e.g., coupled to) a furnace, such as the furnace for a home or other residence. However, embodiments of the present disclosure are not limited to a particular type of furnace. As shown in FIG. 3A, air filter cabinet 332 can include an opening 326, through which an air filter can be inserted, removed from, and/or replaced in air filter cabinet 322.

As shown in FIGS. 3A-3D, the door closure system can include a door 302 and a door frame 312. Frame 312 can be coupled (e.g., attached) to air filter cabinet 322 adjacent opening 326 of air filter cabinet 322, such that frame 312 (e.g., the opening of frame 312) is aligned with opening 326, as illustrated in FIGS. 3A-3D.

Door 302 can be, for example, door 102 previously described in connection with FIGS. 1A-1C, and frame 312 can be, for example, frame 212 previously described in connection with FIGS. 2A-2B. For instance, door 302 can include magnet recess 304, handle 306 having opening 310, and flange 308, in a manner analogous to that previously described in connection with FIGS. 1A-1C, and frame 312 can include magnet recess 314, opening 316, and tabs 318-1 and 318-2 in a manner analogous to that previously described in connection with FIGS. 2A-2B. Further, in the example illustrated in FIG. 3A, the door closure system can include a magnet 324 coupled (e.g., attached) to magnet recess 314 of frame 312, as previously described herein (e.g., in connection with FIGS. 2A-2B). However, in some embodiments, magnet 324 can be coupled to magnet recess 304 of door 302, instead of to magnet recess 314, as previously described herein.

FIG. 3A shows the door closure system when door 302 is not engaged with frame 312. For instance, FIG. 3A shows the door closure system when magnet recess 304 of door 302 is not engaged with magnet 324. That is, FIG. 3A shows the door closure system when opening 326 of air filter cabinet 322 is not covered by door 302.

FIGS. 3B-3D show the door closure system when door 302 is engaged with frame 312. For instance, FIGS. 3B-3D show the door closure system when magnet recess 304 of door 302 is engaged with magnet 324 (or, in embodiments in which magnet 324 is coupled to magnet recess 304 of door 302, when magnet recess 314 of frame 312 is engaged with magnet 324). That is, FIGS. 3B-3D show the door closure system when opening 326 of air filter cabinet is covered by door 302.

When magnet recess 304 of door 302 is engaged with magnet 324 (or, in embodiments in which magnet 324 is coupled to magnet recess 304 of door 302, when magnet recess 314 of frame 312 is engaged with magnet 324), door 302 can be automatically aligned with frame 312 such that opening 326 of air filter cabinet 322 can be fully covered by door 302 without any further guidance from a user of door 302. That is, to cover opening 326 of air filter cabinet 322, the user simply needs to engage magnet recess 304 (or, in embodiments in which magnet 324 is coupled to magnet recess 304, magnet recess 314) with magnet 324.

For example, the user of door 302 may not need to guide door 302 all the way until it is fully engaged with frame 312 or apply a push to secure the closure of door 302. Rather, the user may simply place or throw door 302 against frame 312 so that magnet recess 304 (or, in embodiments in which magnet 324 is coupled to magnet recess 304, magnet recess 314) engages with magnet 324, and the engagement of magnet recess 304 (or magnet recess 314) and magnet 324 will automatically align door 302 and frame 312 to complete the closure of door 302 such that opening 326 is fully covered. Further, the user may utilize flange 308 of door 302 and/or tabs 318-1 and 318-2 of frame 312 to assist with the process of engaging magnet recess 304 (or magnet recess 314) with magnet 324.

Further, door 302 can be automatically aligned with frame 312 using only the engagement of magnet recess 304 (or magnet recess 314) and magnet 324. That is, door 302 may not include any additional components other than magnet recess 304, such as, for instance, springs, rivets, screws, etc., for aligning door 302 with frame 312.

Further, when magnet recess 304 (or magnet recess 314) is not engaged with magnet 324, door 302 can be completely detachable and separable from frame 312. That is, door 302 may not be permanently coupled or attached to frame 312, and may include no additional components, such as springs, rivets, screws, etc., for doing so.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A door for an air filter cabinet, comprising:
   a magnet recess;
   a magnet coupled to the magnet recess and configured to:
      engage directly with a magnet recess of a frame of an air filter cabinet, wherein the magnet extends into both the magnet recess of the frame and the magnet recess of the door when directly engaged with the magnet recess of the frame; and
      automatically align the door with the frame of the air filter cabinet when engaged with the magnet recess of the frame; and
   a handle adjacent the magnet recess of the door, wherein:
      the handle extends in a direction away from the frame when the magnet is engaged with the magnet recess of the frame, at a ninety degree angle from the top of the top portion of the door; and
      the handle includes a portion that extends upward at a ninety degree angle from the rest of the handle.

2. The door of claim 1, wherein the door is configured to align with the frame of the air filter cabinet using only the magnet recess of the door and the magnet.

3. The door of claim 1, wherein the door is completely detachable and separable from the frame of the air filter cabinet when the magnet recess of the frame is not engaged with the magnet.

4. The door of claim 1, wherein the handle forms a part of the geometry of the door.

5. The door of claim 1, wherein the handle includes an opening formed therein.

6. The door of claim 1, wherein the door includes a flange configured to engage with an opening in the frame of the air filter cabinet.

7. The door of claim 1, wherein the magnet is configured to automatically align the door with the frame of the air filter cabinet when directly engaged with the magnet recess of the frame such that an opening of the air filter cabinet is fully covered by the door.

8. The door of claim 1, wherein the magnet is configured to automatically align the door with the frame of the air filter cabinet when directly engaged with the magnet recess of the frame without guidance from a user of the door.

9. The door of claim 1, wherein the door has a height of 16 inches.

10. A door closure system for an air filter cabinet, comprising:
    a frame coupled to an air filter cabinet adjacent an opening of the air filter cabinet, wherein the frame includes a magnet recess; and
    a door, wherein the door includes:
       a magnet recess;
       a magnet coupled to the magnet recess and configured to engage directly with the magnet recess of the frame, wherein the magnet extends into both the magnet recess of the frame and the magnet recess of the door when directly engaged with the magnet recess of the frame; and
       a handle adjacent the magnet recess of the door, wherein:
          the handle extends in a direction away from the frame when the magnet is directly engaged with the magnet recess of the frame, at a ninety degree angle from the top of the top portion of the door; and
          the handle includes a portion that extends upward at a ninety degree angle from the rest of the handle.

11. The door closure system of claim 10, wherein the door includes no additional components for aligning the door with the frame.

12. The door closure system of claim 10, wherein the door includes no additional components for coupling the door to the frame.

13. The door closure system of claim 10, wherein:
    the frame is a metal frame; and
    the door is a metal door.

14. The door closure system of claim 10, wherein:
    the door includes a flange; and
    the frame includes an opening configured to receive the flange during the engagement of the magnet recess of the frame with the magnet of the door.

15. The door closure system of claim 10, wherein the frame includes a number of tabs under which the door is configured to be placed during the engagement of the magnet recess of the frame with the magnet of the door.

16. The door closure system of claim 10, wherein the door has a height of 20 inches.

* * * * *